US005464536A

United States Patent [19]

Rogers

[11] Patent Number: 5,464,536
[45] Date of Patent: Nov. 7, 1995

[54] APPARATUS FOR CENTRIFUGALLY SEPARATING A FLUID MIXTURE INTO ITS COMPONENT PARTS

[75] Inventor: Ernest Rogers, Pleasant Grove, Utah

[73] Assignee: Charles W. Taggart, Salt Lake City, Utah

[21] Appl. No.: 896,185

[22] Filed: Jun. 10, 1992

[51] Int. Cl.$^6$ ...................................................... B04B 7/04
[52] U.S. Cl. .................................. 210/380.1; 210/360.1; 210/512.1; 210/787; 494/43; 494/60
[58] Field of Search .............................. 210/360.1, 380.1, 210/787, 512, 512.3; 494/43, 60

[56] References Cited

U.S. PATENT DOCUMENTS

| | | | |
|---|---|---|---|
| 315,876 | 4/1885 | Zimmer. | |
| 690,883 | 1/1902 | Sharples. | |
| 1,811,157 | 6/1931 | Schwerdtfeger. | |
| 2,077,813 | 4/1937 | Strezynski | 233/46 |
| 2,126,864 | 8/1938 | Bath | 233/20 |
| 2,269,716 | 1/1942 | Gregg | 233/1 |
| 2,422,464 | 6/1947 | Bartholomew. | |
| 2,667,302 | 1/1954 | Schmitz et al. | 233/1 |
| 2,733,855 | 2/1956 | McCoy | 233/2 |
| 2,870,912 | 1/1959 | Mathieu | 210/213 |
| 3,081,027 | 3/1963 | Coulson | 233/4 |
| 3,201,036 | 8/1965 | Halbach et al. | 233/14 |
| 3,437,209 | 4/1969 | Evans | 210/374 |
| 3,460,751 | 8/1969 | Hemfort, Sr. | 233/21 |
| 3,647,135 | 3/1972 | Mercier | 233/1 A |
| 3,655,058 | 4/1972 | Novak | 210/360 |
| 3,825,177 | 7/1974 | Kohlstett | 233/20 A |
| 4,015,773 | 4/1977 | Thylefors | 233/20 A |
| 4,098,696 | 7/1978 | Humphrey et al. | 210/168 |
| 4,175,040 | 11/1979 | Sammons et al.. | |
| 4,190,530 | 2/1980 | Forsythe, Jr. et al. | 210/31 R |
| 4,362,620 | 12/1982 | High | 210/378 |
| 4,406,791 | 9/1983 | Khapaev | 210/649 |
| 4,810,240 | 3/1989 | Zuccato | 494/14 |
| 4,855,050 | 8/1989 | Senyard, Sr. et al. | 210/512.1 |

(List continued on next page.)

FOREIGN PATENT DOCUMENTS

| | | |
|---|---|---|
| 672184 | 12/1929 | France. |
| 826502 | 4/1938 | France. |
| 321855 | 6/1920 | Germany. |
| 610608 | 3/1935 | Germany. |
| 723672 | 8/1942 | Germany. |
| 3408789 | 9/1985 | Germany. |
| 957929 | 2/1981 | U.S.S.R.. |

OTHER PUBLICATIONS

D. Macdonald, "Evaluation of separation problems for disc bowl centrifuges," *The Chemical Engineer*, Mar. 1985, pp. 15–17.

Product brochure from Alfa–Laval, "ALFAX self–cleaning centrifugal separators with controlled partial discharge—WHPX series," (date unknown).

Product brochure from Alfa–Laval, "Solids–ejecting Separator Type CHPX 517 for the Chemical and Pharmaceutical Industries," (date unknown).

"Technology in Perspective—Giving ear to improved centrifuge performance," *The Chemical Engineer*, pp. 15–17 (Jun., 1988).

Primary Examiner—Robert A. Dawson
Assistant Examiner—David Reifsnyder
Attorney, Agent, or Firm—Madson & Metcalf

[57] ABSTRACT

An apparatus and method for centrifugally separating a mixture of liquids comprises a central inlet shaft, a surrounding rotor, and a housing shell. The mixture is injected into the rotor through the inlet shaft and the rotor separates the mixture in a radially sloped separation space containing a first weir, discharges the lighter liquid into the housing through a channel through the weir and wall of the separation chamber, and discharges the heavier liquid into the housing over a second weir. The inlet shaft may be built up to provide for efficient shear mixing and a sieve may be provided in the separation chamber. A two-stage separator may be constructed by providing a second separation chamber radially outward of the first after mixing of a separated liquid with a solvent and providing suitable discharge ports.

27 Claims, 5 Drawing Sheets

U.S. PATENT DOCUMENTS

| | | | |
|---|---|---|---|
| 4,857,040 | 8/1989 | Kashihara et al. | 494/60 |
| 4,871,458 | 10/1989 | Purvey | 210/360.1 |
| 4,936,821 | 6/1990 | Zuccato | 494/14 |
| 4,959,158 | 9/1990 | Meikrantz | 210/787 |
| 5,068,035 | 11/1991 | Mohr | 210/236 |
| 5,114,568 | 5/1992 | Brinsmead et al. | 209/170 |
| 5,149,432 | 9/1992 | Lavin | 210/360.1 |

5,464,536

APPARATUS FOR CENTRIFUGALLY SEPARATING A FLUID MIXTURE INTO ITS COMPONENT PARTS

FIELD OF THE INVENTION

The present invention concerns separation apparatuses and methods, and particularly those systems that separate two or more mixed fluid components through centrifugation.

BACKGROUND OF THE INVENTION

Centrifugal systems of separation use centrifugal force generated through rotation to separate fluid components of differing densities. In many fundamental aspects, these systems are used as a substitute for and improvement on gravitational separation techniques and devices, since the gravitational force and the force exerted on a fluid through rotation (centrifugal) are identical in that they increase in magnitude as the fluid increases in mass. Those fluids with lesser density will be less influenced by the force and therefore less inclined toward the source of the force, the earth for gravitational, the outside of the rotating container for centrifugal, than fluids with greater density. The fluids will thus separate out and can be directed to separate collection ports by using weirs or other suitable separating structures. Centrifugal separation is often more desirable than gravitational because the force applied to the fluid can be controlled through rotation speed and can be made to be many times that of gravity.

A common example of fluid separation is that of oil from water. There are many situations in which separation of these two elements is desired, such as oil spills on an ocean or lake, mixing of the two fluids in ships' bilges, gasoline spills, etc. This process is often important for maintenance of quality of life in a particular geographic area. These two fluids are susceptible to centrifugal separation because water is denser than oil and thus will "sink" relative to the other under application of centrifugal force. This can easily be understood by the fact that oil floats on water in a gravitational field. Other fluid separation applications include wine clarification, waste-water treatment, blood plasma separation, and the like. Centrifugation is also used to separate solids out of liquids through sedimentation.

It is often desirable to separate dissolved elements in solution or emulsion. Standard centrifugal separation equipment alone cannot carry out such a separation since the dissolved elements will move with the solution. A solvent must therefore be introduced into the fluid stream to extract the dissolved elements. Such a process requires that the solvent be thoroughly mixed with the fluid to extract all dissolved elements. The solvent and fluid are then separated through centrifugation. An example of this type of separation is solvent extraction and separation of transuranic elements from radioactive waste streams at nuclear processing plants.

Meikrantz, U.S. Pat. No. 4,959,158, is an example of a typical centrifugal separator in the prior art. In that apparatus, the fluid to be separated is introduced into a space between an inner rotor and an outer stationary housing, where shear mixing of the fluid occurs. A large amount of power is required to maintain the speed of the rotor against the viscous drag of the shearing liquid which makes the apparatus energy inefficient. The power loss increases with angular velocity, limiting the rotor speed.

The rotor is an open top cylinder with the separating weirs at the top. Meikrantz uses the space between the rotor and its housing to introduce the oil-water mixture to be separated. Thus the bottom portion of the space is filled with liquid during operation. The top portion of the space, where the liquids separate and transfer from the rotor to the housing, must contain air for proper operation. (This requires the separator to operate in an upright position). In this space, no seals can be made between the incoming liquid and the air because of the large diameter of the interface; the drag would be unacceptable. This highly agitated air/liquid interface causes the fluid input into the rotor to mix with the air, reducing flow capacity and causing foaming with many substances such as detergents in motor oil. This foaming dramatically reduces the effectiveness of the separator and further increases viscous drag. Meikrantz allows a second air-water interface to exist within the rotor, as a core of air forms radially inward from the first weir, at the center of the rotor. Energetic flow of liquid through the separator causes surface waves to form on this interface, which further degrades the separation process. Additionally, the lighter separated liquid spreads along the full length of the rotor between the air core and the partially defined liquid/liquid interface. This disperse unstable mass is difficult to collect over the relatively short first weir.

OBJECTS AND SUMMARY OF THE INVENTION

It is therefore an object of the present invention to overcome the shortcomings of the prior art.

It is a further object of the invention to input and mix the fluid to be separated without admitting air.

It is a further object of the invention to provide a centrifugal separator which can be made to operate in any orientation.

It is a further object of the invention to minimize fluid motion and contact of fluid with air, and to minimize the power required to operate a separator while maximizing flow capacity.

It is a further object of the invention to optimize the weir structure in centrifugal separators so that the fluid will separate under a wide range of conditions such as various flow rates, different ratios of liquid mixtures, differing component fluid densities, and differing viscosities, and to control air pressure over the weirs and remove formed gases.

It is a further object of the invention to utilize lipophilic surfaces more effectively than in stationary separators.

It is a further object of the invention to utilize optimized weir structures in centrifugal separators so that the fluid will separate under a wide range of conditions, automatically, without need for external control or adjustment, and to control air pressure over the weirs, and remove gases.

It is a further object of the invention to utilize lipophilic surfaces more effectively than in stationary separators, to provide means for controlling fluid motion in the rotor, and to allow for complete automatic draindown and flushing.

It is a further object of the invention to provide a two-stage separator using solvent extraction or other chemical means for separation both of immiscible materials and dissolved materials, removal of foams and emulsions, and to obviate the need for a secondary process.

In accordance with a first aspect of the invention, an apparatus for centrifugally separating into its component parts a mixture having immiscible component parts of a first liquid and a second liquid of differing densities, comprises an elongate inlet shaft having an open receiving end for receiving mixture and an open discharge end through which the mixture is delivered into the apparatus, a rotor disposed substantially coaxially to and surrounding the inlet shaft and adapted for rotational movement thereabout, and a housing surrounding the rotor for receiving and collecting the separated liquids from the rotor. The rotor contains an optional mixing chamber around the inlet shaft with walls comprising the inlet shaft itself and a frustoconical center wall surrounding the inlet shaft, an annular separation chamber which receives the mixture from the mixing chamber, whose inner wall is the frustoconical center wall and whose outer wall slopes oppositely the center wall, and further comprising an annular first weir disposed at the larger end of the separation chamber. A lighter liquid channel is formed between the base of the first weir and the center wall, and a heavier liquid channel is formed between the first weir and the outer wall. A discharge passage for the lighter liquid is provided from the first weir to a collection chamber in the housing. A second weir is formed beyond the first weir for the discharge of the heavier liquid into a second collection chamber in the housing.

In accordance with a second aspect of the invention, a method of centrifugally separating a mixture containing component parts of first and second immiscible liquids comprises the steps of inputting the mixture through an input shaft into the approximate center of a rotatable rotor having a radially outwardly sloping center wall with an annular outer edge surrounding the input shaft, rotating the rotor causing the mixture to move down the slope of the center wall and flow over the edge thereof into a separation chamber formed by the center wall and a coaxial outer wall having an opposite radial slope from the center wall and a first weir disposed oppositely from the center wall edge, separating the mixture into its component parts in the separation chamber, discharging the first liquid from the separation chamber through a first annular channel between the center wall and the first weir, channeling the first liquid to a first collection chamber, discharging the second liquid from the separation chamber through a second segmented annular channel between the outer wall and the base of the first weir, and channeling the second liquid to and over a second weir and into a second collection chamber.

In accordance with a third aspect of the invention, an apparatus for centrifugally separating into its component parts through solvent extraction a liquid mixture, containing first and second immiscible liquids and contaminants dissolved or emulsified in the second liquid, comprises a first separation chamber which separates the immiscible liquids, a first discharge channel for discharging the first liquid into a housing, a mixing chamber for mixing the second liquid with a solvent, a second separation chamber for separating the second liquid from the solvent, and second and third discharge channels for discharging the solvent and second liquid, respectively, into the housing.

In accordance with a fourth aspect of the invention, a method of separating a mixture of first and second liquids into its component parts comprises injecting the mixture into a rotatable rotor, separating the first and second liquids from each other in a first separation chamber, discharging the first liquid from the rotor, injecting a solvent into the rotor, mixing the second liquid with the solvent, separating the second liquid from the solvent in a second separation chamber, discharging the solvent from the rotor, and discharging the second liquid from the rotor.

BRIEF DESCRIPTION OF THE DRAWINGS

These and other objects, aspects, and embodiments of the present invention will be apparent to those skilled in the art from the following description and accompanying drawing figures, of which.

DETAILED DESCRIPTION OF THE INVENTION

Figure 1:
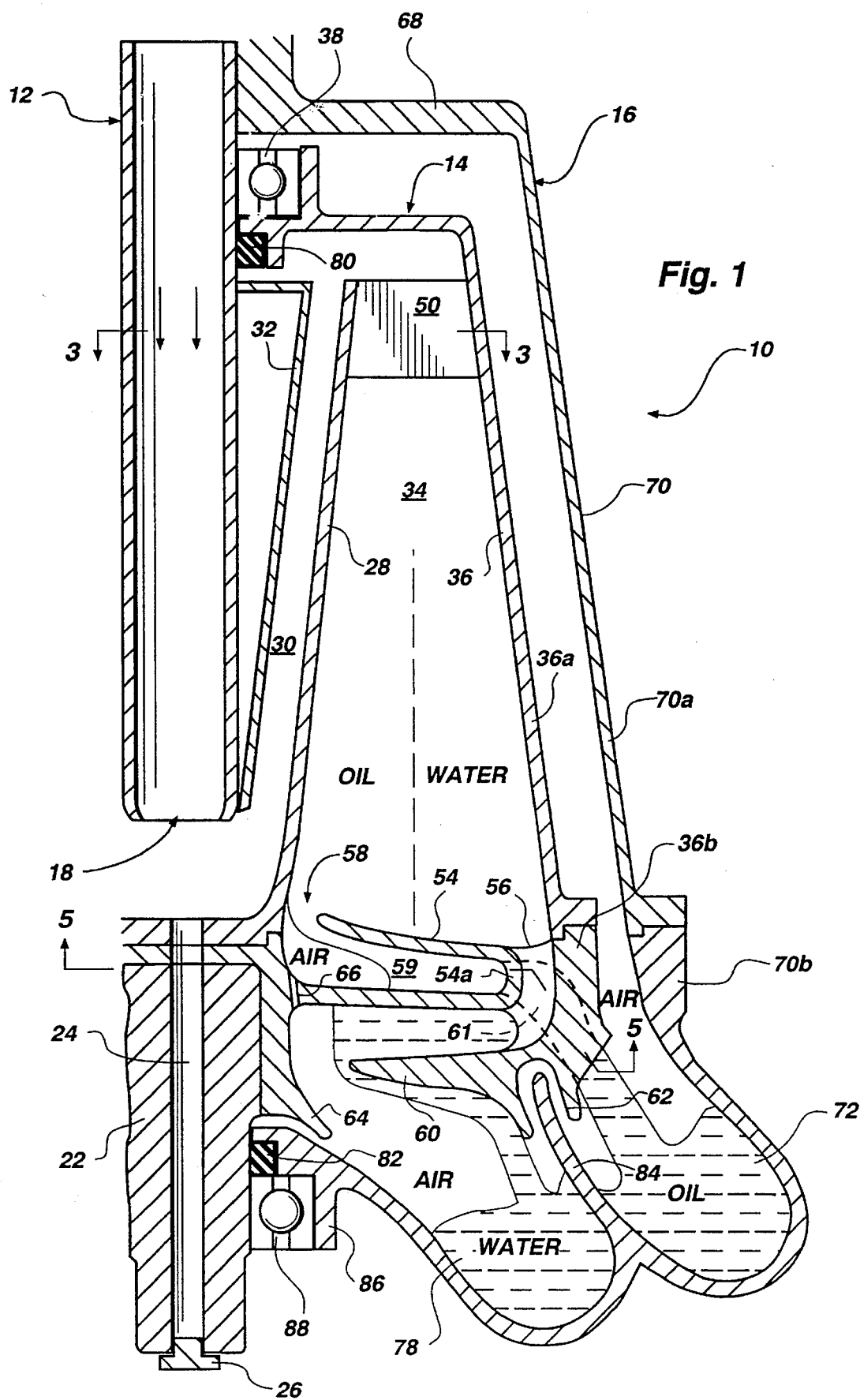
FIG. 1 is a partial elevational view in cross-section of an example of a single stage centrifugal separator according to the invention.

Referring first to FIG. 1, a single stage centrifugal separator 10 according to the invention separates a combined stream of two immiscible liquids of differing densities into its component parts. The invention will be described as separating a stream of oil mixed with water, though it will be understood that the invention efficiently separates other fluid combinations. The separator 10 comprises three principal components: a stationary shaft inlet port 12, a rotor 14 adapted for rotational movement around the inlet port 12, and a stationary housing shell 16 surrounding the rotor 14. The components comprise in construction a suitably rigid material such as steel or plastic in the preferred embodiment.

The oil and water mixture enters the separator 10 through a mouth 18 of the stationary shaft 12. This inlet arrangement has the advantage of eliminating contact of the mixture with the air between the rotor 14 and the housing 16, minimizing agitation and foaming which hamper separation. Additionally, the separator 10 can be used in any orientation as long as the output structures are appropriately designed since the oil/water mixture does not enter the space between the rotor 14 and the housing 16, and thus can not interfere with transfer of the separated liquids from the rotor to the housing. Nevertheless, the described embodiment of the separator 10 is intended for use in a vertical position with the fluid combination downwardly traveling through the inlet shaft 12, as shown by the arrows in FIG. 1.

The inlet shaft 12 comprises a single hollow shaft in the single-stage version or a plurality of smaller shafts, such as a bundle of shafts or a concentric arrangement, which will be described later in conjunction with the two-stage embodiment of the invention.

The rotor 14 comprises a rotatable drive shaft 22, located coaxially to and beneath the inlet shaft 12, which is rotated by any suitable means such as a motor and accompanying drive train (not shown). The drive shaft 22 rotates the rotor at a speed determined to be suitable in light of weir structure, relative densities of the fluids being separated, size of the separator components, magnitude of desired centrifugal force, and other factors familiar to those skilled in the art. If desired, the drive shaft 22 may contain a drain channel 24, having a stopper or closure 26 secured therein by threading or other means, for convenient flushing and draindown of the separator 10 by running a suitable cleansing fluid through the inlet port 12, allowing the fluid to run through the separator, and draining the excess through the unstopped drain channel 24.

A center wall 28 rises from the drive shaft 22, creating a mixing chamber 30 where the input fluid is mixed through shearing between the moving center wall 28 of the rotor and the outer wall of the stationary input shaft 12. The mixing chamber 30 has a small volume relative to, e.g., a mixing chamber at the periphery of a separator, minimizing shear resistance and thus the power required to maintain the rotor at the desired speed. The volume of the mixing chamber optionally can be further decreased by mounting a frustoconical protrusion 32 on the stationary shaft 12 or by otherwise building up the volume displaced by the stationary shaft 12 or center wall 28. The mixing chamber may be optionally deleted where the mixing function is not needed as will be further described with reference to FIG. 2. A primary purpose of the mixing chamber is for addition of a conditioning material, such as a solvent for reducing viscosity or for solvent extraction.

The fluid mixture flows with the aid of externally applied pressure and centrifugal force from the mixing chamber, or optionally from the inlet shaft, into the separation chamber 34, formed by the center wall 28 and the coaxial outer wall 36, where the component fluids are separated. The outer wall 36 slopes oppositely from the center wall 28, causing the separated oil and water to move downwardly along the inner and outer walls, respectively, toward the separator's weir structures. The top of the outer wall 36 meets the stationary shaft 12 in annular engagement. At that location, bearings 38 are mounted between the wall 36 and the shaft 12 to enable the rotor 14 to rotate relative to the stationary shaft 12. Shaft seal 80 is provided to protect the bearing from contact with the internal fluids.

Figure 2:
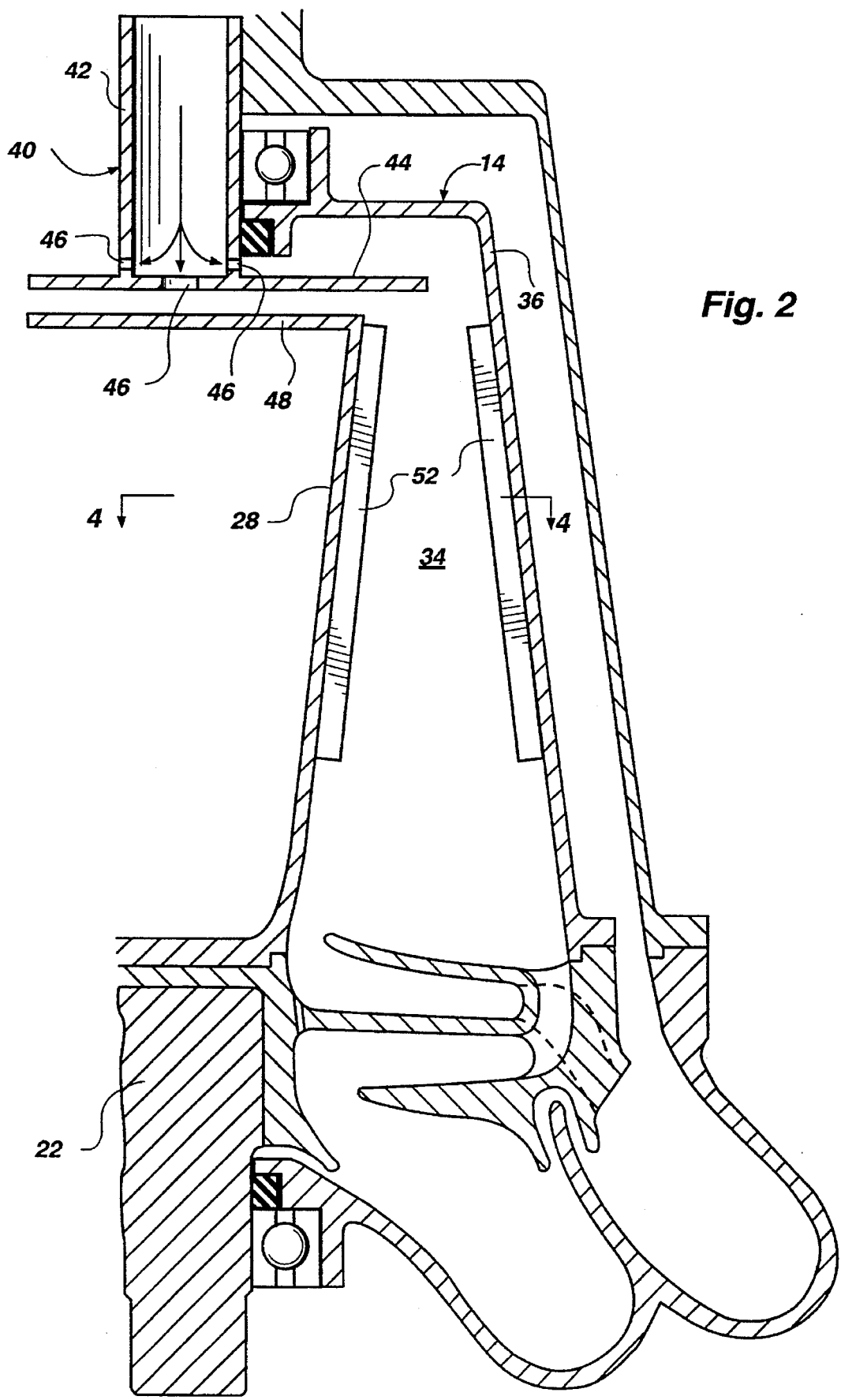
FIG. 2 is a partial elevational view in cross-section of the separator of FIG. 1 showing an alternative inlet port and vanes in the separation chamber.

FIG. 2 illustrates an alternative inlet port 40 comprising a stationary shaft 42 which differs from the stationary shaft 12 in that it is shorter and capped by a disc 44 which extends out from the shaft 42 as a flange. The input fluid enters the rotor 14 through holes 46 near the bottom of the shaft 42 and in the disc 44. The center portion of the rotor 14 inside the center wall 28 and below the inlet port 40 is sealed off by a top wall 48, whereby the input fluid is shear mixed in the region between the disc 44 and the top wall 48 and the region between the disc 44 and the top of the outer wall 36 before entering the separation chamber 34. The inlet port 40 allows for complete flushing and draindown of the separator without a drain channel in the drive shaft 22, since no liquid collects in the region inside the center wall 28. Optionally, mixing of the input flow may eliminated from the design of FIG. 2 by deleting the shear disk 44.

Referring again to FIG. 1, the oil and water of the input fluid combination separate in the separation chamber 34 owing to the lighter density of oil relative to water. In the field of the centrifugal force created by the rotation of the rotor 14, the oil "rises" radially inwardly toward the center wall 28 while the water "sinks" radially outwardly toward the outer wall 36.

Figure 3:
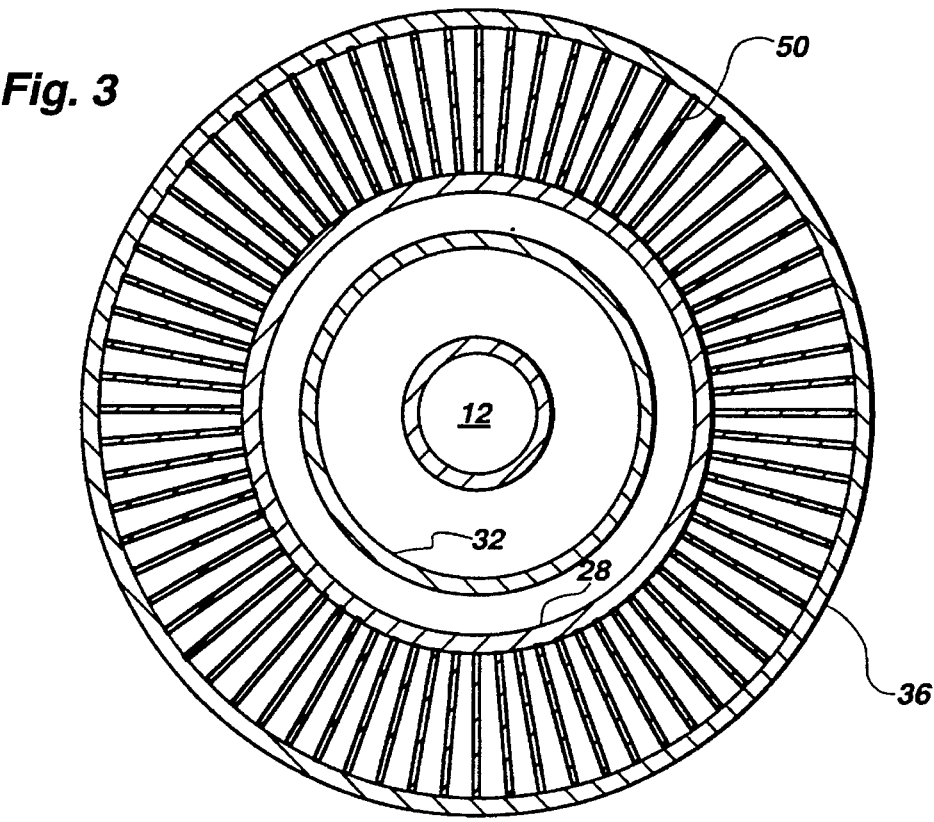
FIG. 3 is a view along line 3—3 in FIG. 1.

If desired, an optional sieve 50 illustrated in FIGS. 1 and 3 can be mounted between the center wall 28 and the outer wall 36 in the upper portion of the separation chamber 34 to aid the separation. The sieve 50 comprises a plurality of closely spaced, radially oriented plates parallel to the axis of rotation in the preferred embodiment. For oil/water separation, the plates are coated with or formed from a lipophilic material such as polypropylene. While the fluid mixture travels through the sieve 50, finely dispersed or emulsified oil, which may be difficult to separate simply through centrifugal force, condenses on the surface of the plates and is thereby collected and separated from the water. Sieves used in gravitation separators have not been effective since they must be large with widely spaced plates in order to operate in a 1-g field. When used in the separator 10, however, the sieve can be small with closely spaced plates due to the higher magnitude of the g field. These modifications greatly improve separation effectiveness.

Figure 4:
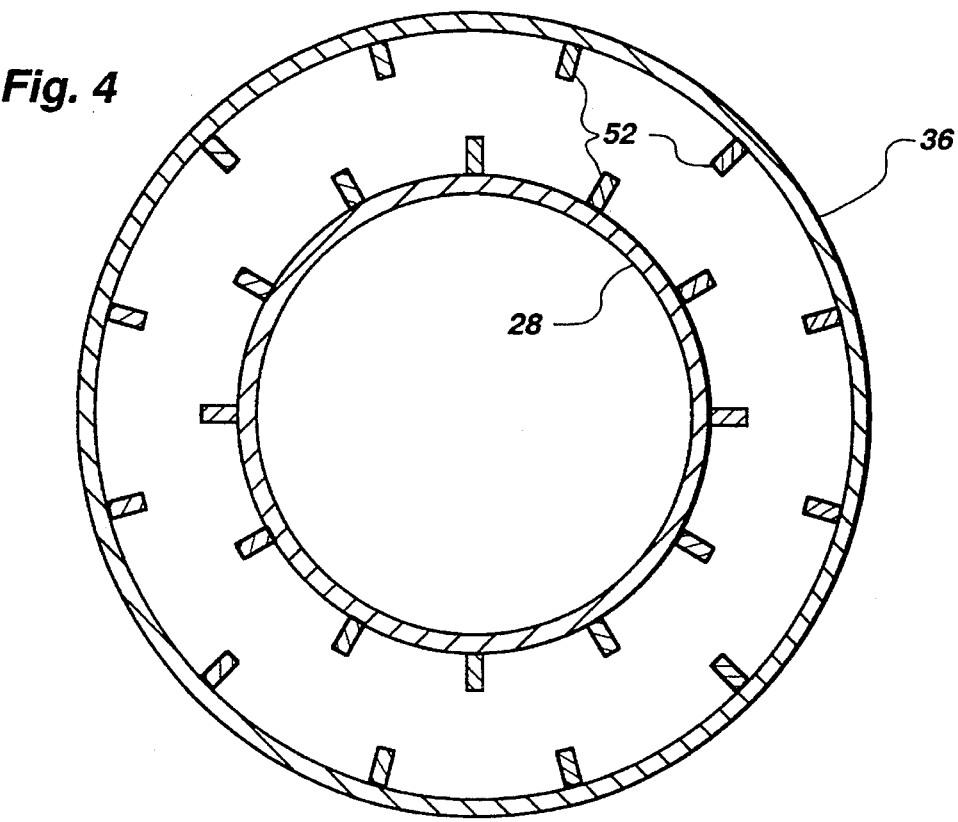
FIG. 4 is a view along line 4—4 in FIG. 2.

The sieve 50 also redirects and aligns the flow of incoming fluid. It has been found effective to guide the fluid in the axial direction to avoid shearing against the center and outer walls 28 and 36. Vanes or ribs 52, illustrated in FIGS. 2 and 4, may alternatively be mounted on the walls of the separation chamber to accomplish the same purpose. The vanes 52 may partially or completely traverse the separation chamber 34 in the radial direction.

Figure 5:
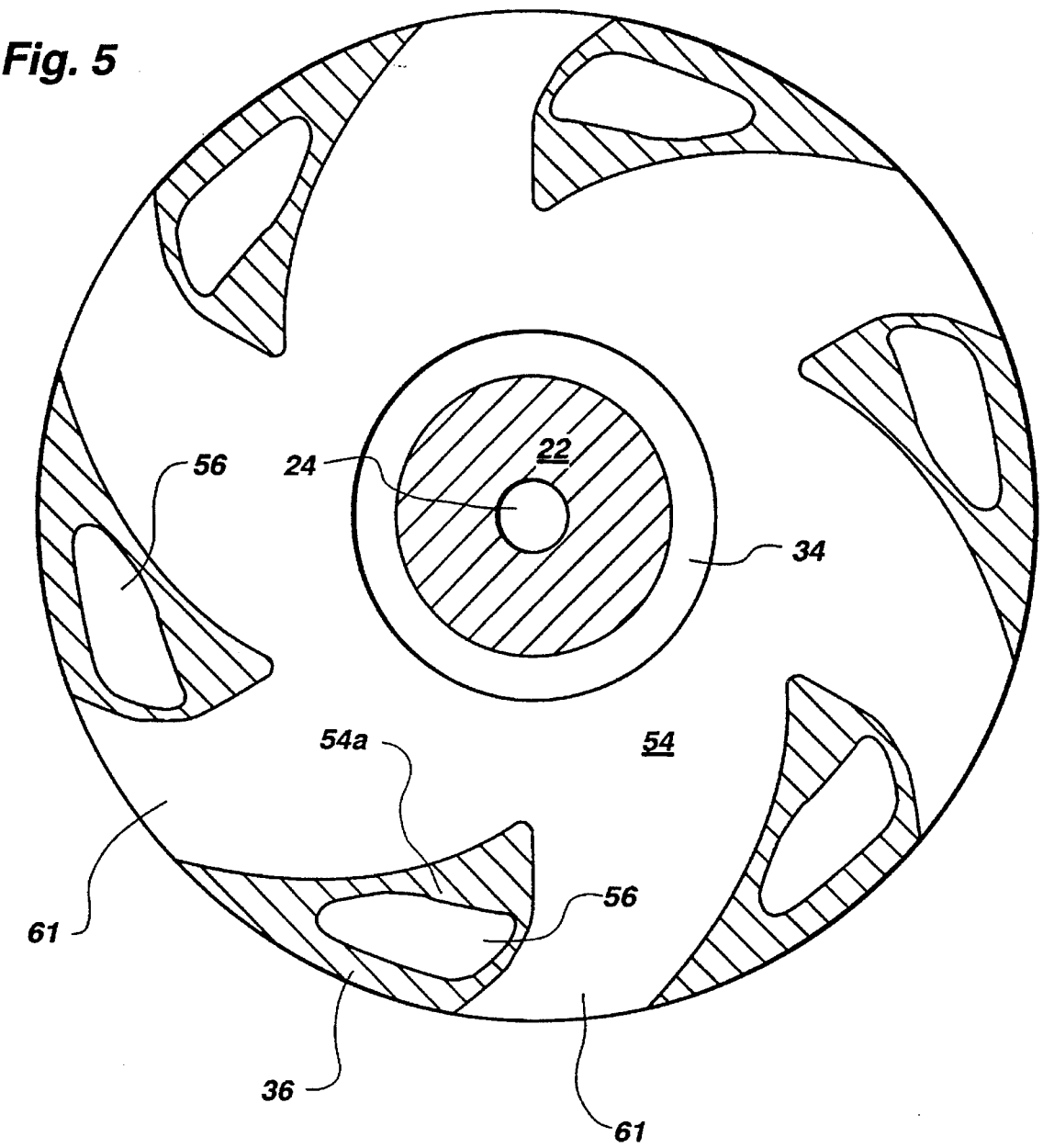
FIG. 5 is a view along line 5—5 in FIG. 1.

As illustrated in FIGS. 1 and 5, the separation chamber 34 contains a weir 54 at its bottom for direction of the separated oil and water. The weir 54 comprises an annular baffle plate attached to and extending from the drive shaft 22 toward the outer wall 36. The plate bends back upon itself to extend toward the center wall 28 before reaching the wall 36, at 54a, creating a segmented annular passage 56 between the bend 54a and the outer wall 36 for the passage of water from the separation chamber 34. The weir plate ends a short distance from the center wall 28, creating an annular passage 58 between the edge of the weir 54 and the center wall 28 for the collection of oil from the separation chamber 34. The bent weir plate creates an intermediate oil collection chamber 59 under the top plate of the weir 54. The oil collected in the intermediate chamber 59 is shunted through a plurality of channels 61 formed through the bend 54a in the weir 54, the water passage 56, and the outer wall 36.

The outer wall 36 bends beneath and parallels the curvature of the weir 54 to shunt the collected water back toward the drive shaft 22. The outer wall 36 ends before contacting the drive shaft 22, thereby forming a second weir 60. An annular groove 62 is formed in the side of the outer wall 36 opposite the water passage 56 to receive wall 84 which divides the collection chambers 78 and 72 that respectively conduct outflows of water and oil. As illustrated in FIG. 1, the outer wall 36 is formed of an upper wall piece 36a and a lower wall piece 36b secured to each other by screws or other means. This component configuration is solely for convenience of construction. The wall 36 may if desired comprise a unitary piece without affecting separation. A sloped outcropping 64 extending from the drive shaft 22 guides water away from the shaft seal 82.

The outflow of separated fluids around the weir 54 is controlled so that a stationary oil/water interface is maintained between the outlets in the passages 56 and 58 during rotation. The interface must not approach either outlet too closely or mixed fluid may be discharged. As in prior art apparatuses, air must be present adjacent the edges of each of the weirs 54 and 60 since separated liquid outflow rates are determined by free-surface flow over the weirs 54 and 60. In the present invention, however, the air/liquid interface at the center of the rotor 14 is largely eliminated by the radially outward slope of the center wall 28, which causes most of the center wall to be radially more outward than the edge of the weir 54, confining the necessary air/oil interface to a narrow pocket region adjacent the edge of the weir 54 where the center wall is sufficiently inward relative to the weir edge to establish a free liquid surface. Thus, the rotor 14 separates substantially all the input liquid without interaction with air and consequent foaming and interference with separation. A similar pocket of air is disposed near the edge of the weir 60. Air ducts 66 formed through the bottom plate of the weir 54 equalize pressure between the two pockets of air and remove excess gases therefrom which form, e.g., by bubbles of air mixed with the input fluid which "rise" to the center wall and migrate along it until they join with the pocket of air near the edge of the weir 54.

The sloping of the center and outer walls 28 and 36 allows the weirs 54 and 60 to be large in relation to overall rotor size, improving flow rate and separation efficiency. The formula for the position of the liquid/liquid (oil/water) interface between the separated liquids in the separation chamber 34 is $$r_b = \sqrt{\frac{\rho_w r_w^2 - \rho_o r_o^2}{\rho_w - \rho_o}}, \tag{1}$$

where $r_b$ is the radial distance of the liquid/liquid interface from the axis of rotation, $r_w$ is the radial distance of the heavier liquid surface over the second weir edge, $r_o$ is the radial distance of the lighter liquid surface over the first weir edge, $\rho_w$ is the density of the heavier liquid, and $\rho_o$ is the density of the lighter liquid.

The liquid/liquid interface in the separation chamber 34 must lie between the edge of the weir 54 and the bent portion 54a of the weir to avoid discharge of mixed fluid. This is expressed in mathematical terms as:

$$r_1 < r_b < r_p, \tag{2}$$

where $r_p$ is the radial distance of the bent portion 54a of the first weir $r_1$ is the radial distance of the edge of the first weir.

Thus, as the distance between the edge of the first weir 54 and the bent portion 54a of the weir increases, the range of possible positions of the liquid interface increases and thus the range of liquid densities that can be separated by the weirs. These relationships can be used to design a weir structure that performs optimally for any particular application.

It has been found that the optimum weir construction for a separator designed to separate common crude oils from water where the crude oils have specific gravities ranging from 0.82 to 0.92 satisfies the following relationship:

$$r_w = .937 r_o + .05 r_p + .008 \frac{r_p^2}{r_o}. \tag{3}$$

The depth of the liquid over the edge of a weir, indirectly represented in the equations by $r_w$ and $r_o$, depends on the relative proportions of the component fluids in the input mixture, viscosity, input flow rate, and speed of the rotor 14. The most effective designs will maintain a shallow flow over the weir edges. Air pressure at the weir edges must be equal in order for the above equations to be valid, accomplished by the air ducts 66 or other equivalent means.

The housing 16 collects the separated liquids from the rotor 14. The housing 16 is a single shaped wall which is formed around the rotor 14 and which completely encloses it. The annular top 68 of the housing, secured to the input shaft 12 by suitable means, extends out horizontally past the rotor 14. A sidewall 70 meets the edge of the top 68 and descends parallel to the outer wall 36 of the rotor. In the described embodiment the sidewall 70 is formed from two pieces 70a and 70b for convenience of construction, which are joined near the bottom of the sidewall 70 by screws or other suitable means in a fashion similar to the outer wall 36 of the rotor.

An oil collection chamber 72 is formed at the bottom of the sidewall 70 to receive the separated oil from the oil channels 61 through the wall 36. A water collection chamber 78 is formed adjacent to and radially inward from the oil collection chamber 72. An intermediate wall 84 is formed between the oil and water collection chambers 72 and 78 to keep the separated fluids apart. The end of the wall 84 fits into the annular groove 62 of the rotor to effectively prevent cross-contamination of the separated fluids. The collection chambers 72 and 78 are provided with attachments (not shown) for connection of pipes or hoses that remove the separated fluids.

The end of the radially inward wall 86 of the water collection chamber 78 fits against the drive shaft 22 underneath the outcropping 64 in annular engagement. Bearings 88 are mounted between the end of the wall 86 and the drive shaft 22 to allow the rotor 14 to rotate within the housing 16. A seal 82 is provided to protect the bearing from the internal fluids.

The separator 10 can be flushed and cleaned by operating it with a cleaning slurry containing water, hexane, and a suitable detergent, or another similar slurry formulation. The weirs and flow channels of the separator are sloped so that no liquid is trapped inside when the separator and the input liquid flow are stopped.

The separator 10 can be made in various sizes, all of which are functionally equivalent except that larger sizes will have a lower angular velocity in equivalent applications. The range of liquids that can be separated remains the same.

Figure 6:
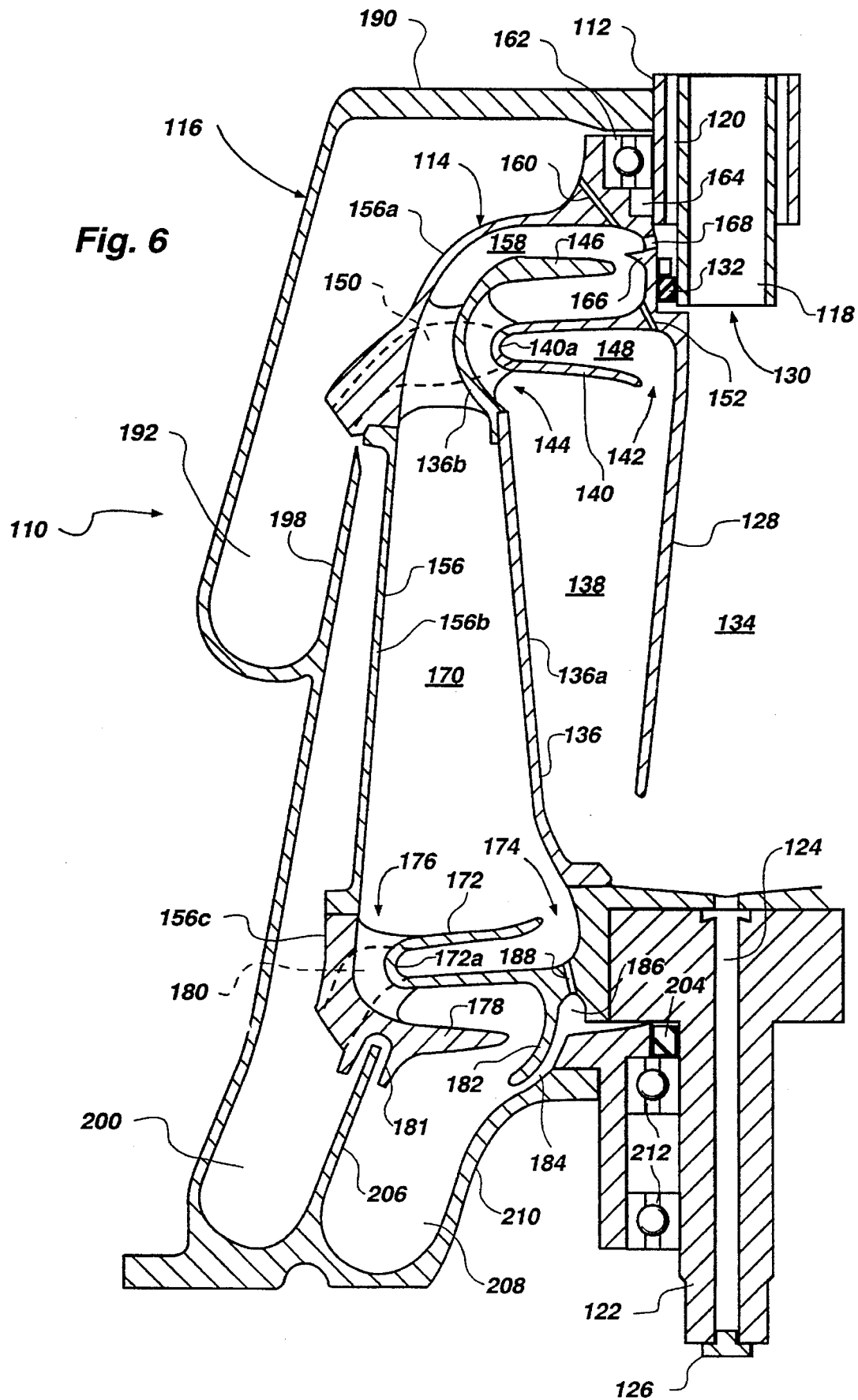
FIG. 6 is an elevational view in cross-section of an example of a two stage centrifugal separator according to the invention.

FIG. 6 shows a two-stage separator 110 according to the invention. The separator 110 separates immiscible liquids containing dissolved contaminants or immiscible liquids that are resistant to separation, such as those in an emulsion. The one-stage separator 10 is not able to separate out dissolved contaminants in mixed fluids in a single operation. The separator 10 is able to separate fluids resistant to separation to a degree, particularly with the help of the sieve 50, but does so inefficiently. This is the case especially with very stable, finely dispersed colloidal suspensions and solutions.

As is known in the art, a separator such as the separator 10 can be used in two stages to separate immiscible liquids and dissolved contaminants. The immiscible liquids first are separated through the process described above, and the separated liquid containing the contaminants is mixed with a solvent that has a higher affinity for the contaminants, by which means the solvent breaks down the solution or emulsion and absorbs the dispersed contaminant into itself. The solvent and liquid, which preferably are immiscible, are then separated by putting them through the separator 10 a second time. The solvent can conveniently be mixed with the liquid containing the contaminant by putting them into the separator 10 in combination and allowing them to mix through the shear action in the mixing chamber 30 of separator 10 (FIG. 1). If it is required that the liquid be of very high purity, the solvent purification process can be repeated until the desired level of purity is obtained.

Solvent extraction separation is desirable for mixtures such as commercial motor oil mixed with water, since commercial motor oils contain detergents that cause foaming and emulsions. A further example is a mixture of commercial gasoline with water: gasoline formulations contain carcinogenic substances as additives, such as benzene, toluene, ethyl benzene, xylenes, and naphthalene. The additives are slightly soluble in water, allowing a few parts per thousand to exist in solution.

The two-stage separator 110 carries out the required stages of initial separation, solvent extraction, and final separation in a single operation. The separator 110 will be described as separating motor oil mixed in water with the oil containing benzene contaminants which slightly dissolve in water. The solvent used preferably is hexane or, alternatively, pentane. It will be understood that various other mixtures and solvents can be used. The separator 110 is similar in construction to the separator 10 in many aspects, except that, among other differences, it contains two separation chambers with the high-density liquid output of the first chamber continuing into the second, radially more outward, chamber after being injected with a solvent.

The separator 110 comprises a stationary input shaft 112, a rotor 114, and a housing shell 116. The input shaft 112 comprises two coaxial shafts, an inner shaft 118 through which the oil/water mixture enters the separator, and an outer shaft 120 through which the hexane solvent enters. The rotor 114 is driven by a rotatable drive shaft 122 under the power of a motor or other means (not shown). A drain channel 124 having a stopper 126 is provided in the drive shaft 122 for complete flushing and draindown of the separator 110. The center wall 128 of the rotor 114 extends downwardly from its point of origin at the side of the mouth 130 of the inner input shaft 118, and slopes radially outwardly before ending near the top of the drive shaft 122. The center wall 128 is sealed from the outer input shaft 120 by an annular seal 132, preventing solvent from entering the chamber 134 formed by the center wall 128.

An intermediate wall 136 attaches to the top of the rotatable shaft 122 and extends up and radially outward, creating a separation chamber 138 between the intermediate wall 136 and the center wall 128. The input oil/water mixture enters the chamber 134 from the inner shaft 118 and is urged downwardly by external pressure and centrifugal force during rotation. The mixture then flows around the edge of the center wall 128 into the separation chamber 138, wherein the separated components are urged upwardly by the radially outward slope of the intermediate wall 136 (for the water) and the radially inward slope of the center wall 128 (for the oil) toward a weir 140 disposed at the top of the separation chamber 138.

The weir 140 is similar in construction to the weir 54 in the single stage separator 10. The weir 140 comprises a baffle plate which originates from the center wall 128, extends radially outward, and bends back upon itself, creating an annular oil passage 142 between the edge of the weir 140 and the center wall 128. A water passage 144 is formed between the bent portion 140a of the weir and the intermediate wall 136, the latter curving around the weir 140 to continue the passage 144 and form a weir 146. For convenience of construction, the intermediate wall comprises two portions, a lower portion 136a and an upper portion 136b which are joined by welding or other suitable means near the bent portion 140a of the weir 140. An intermediate oil chamber 148 is formed in the interior of the weir 140, and an oil channel 150 is formed through the bent portion 140a of the weir, the water passage 144, and the intermediate wall 136.

The weirs in the two-stage separator 110 are preferably made in accordance with the optimal weir construction previously described.

The separation chamber 138 separates the oil/water mixture, after which the separated oil is directed through the passage 142, into the chamber 148, and through the channel 150. The water is directed into the passage 144 and over the edge of the weir 146. The air pockets over the weirs 140 and 146 communicate through air ducts 152, thereby equalizing their pressure.

An outer wall 156 is provided over the intermediate wall 136 to form an outer water passage 158 over the weir 146, and has air ducts 160 formed therethrough to allow the air pocket over the weir 146 to communicate with the housing space. The end of the outer wall 156 meets the input shaft 112 in annular engagement. Bearings 162 are mounted between the wall 156 and the shaft 112 to allow rotation of the rotor 114 around the input shaft 112. A seal 164 also is provided between the outer wall and the inlet shaft. A lip 166 is formed on the end of the center wall 128 at the point at which it meets the outer wall 156 in order to guide the water around the weir 146 and to direct solvent into the water stream.

A solvent channel 168 is formed at the juncture of the outer wall 156 and the center wall 128 between the outer inlet shaft 120 and the outer water passage 158, supplying hexane solvent into the water stream just above the weir 146. The solvent and water mix in the outer passage 158 to remove emulsions and dissolved contaminants. The solvent channel 168 is directed so that the solvent is introduced into the high-velocity water stream flowing over the weir 146 to facilitate mixing. The weir 146 is formed with an appropriate slope and contour to prevent the water flow from separating from the face of the weir, which facilitates mixing and mitigates weir erosion. All weirs in the various illustrations are intended to illustrate similar slope and contour for this same purpose.

It can be seen that the oil channel 150 continues from the intermediate wall 136 through the outer water passage 158 and outer wall 156 to a collection chamber in the housing 116.

The outer water passage 158 continues down between the intermediate wall 136 and outer wall 156 until it enters a second separation chamber 170 formed between the walls 136 and 156. The separation chamber 170 separates the water from the solvent, which contains the extracted contaminants. The outer wall 156 slopes radially outward to urge the cleaned and separated water down to a weir 172 formed at the bottom of the separation chamber 170 which directs the separated liquids out of the separation chamber 170. Hexane has lesser density than water, so the hexane "rises" radially inward toward and is urged downward by the radially inwardly-sloped intermediate wall 136 while the water "sinks" radially outward against the outer wall 156.

The weir 172 is formed from a baffle plate originating on the drive shaft 122, extending radially outward, bending back on itself, and ending before reaching the drive shaft 122 forming an annular solvent passage 174. A water passage 176 is formed between the bent portion 172a of the weir and the outer wall 156, which curves under the weir 172 and ends to form a weir 178. A solvent channel 180 is formed through the bent portion 172a, passage 176, and outer wall 156 to shunt the collected solvent into the housing 116.

The outer wall 156 is formed from three secured pieces 156a, 156b, and 156c for convenience of construction. An annular groove 181 is formed on the outer side of the lower section 156c.

An outcropping 182 extends from the bottom of the weir 172 around the edge of the weir 178 to guide the water into the housing 116. A small air channel 184 underneath the outcropping 182 leads from the housing air space to a cavity 186. Air ducts 188 lead from the cavity 186 to the air pocket at the edge of the weir 172 to equalize the pressure therein.

The housing 116 comprises a top wall 190 secured in annular attachment to the inlet shaft 112 by welding or other means. The top wall 190 extends horizontally outward over the outer wall 156 of the rotor 114, and a side wall descends from it to form an oil collection chamber 192 below the oil channel 150. The chamber 192 receives and collects the separated oil. An attachment (not shown) to the chamber 192 affords connection to a pipe or hose for discharge of the separated oil.

The radially inward wall 198 of the oil collection chamber 192 descends substantially parallel to the outer wall 156 of the rotor, and forms a solvent collection chamber 200 below the solvent channel 180 for the collection of solvent and accompanying contaminants. An attachment (not shown) to the solvent collection chamber 200 affords connection to a pipe or hose for discharge of the solvent. The discharged solvent may be recycled and reused in the separator 110, if desired.

The inner wall 206 of the solvent collection chamber 200 ends inside the annular groove 181 to effectively prevent cross-contamination with purified water in chamber 208. The wall 206 also serves as the outer wall of the water collection chamber 208 formed beneath the weir 178 for collection of water which has been separated from the oil and additionally purified of benzene or other impurities. In other words, the purified water contains neither immiscibles nor solubles. An attachment (not shown) to the water collection chamber is provided for connection of a pipe or hose for removal of the purified water.

The inner wall 210 of the water collection chamber ends in annular engagement with the drive shaft 122. Bearings 212 are mounted between the wall 210 and the drive shaft 122 to allow the drive shaft to rotate within the housing. An annular seal 204 is placed adjacent to bearings 212 to protect them from the internal fluids.

One run through the separator 110 is sufficient to separate out immiscibles and solubles from the water. If desired, the operation can be repeated in order to achieve a higher level of purity.

It will be understood that many different combinations of liquids can be separated by the separator 110. It will also be understood that the different auxiliary structures described with regard to the separator 10 such as the sieve 50 and vanes 52 can also be used beneficially in the separator 110. The present invention includes modifications and variations of the described embodiments, which constitute only a few examples of how the invention may be applied in practice.

I claim:

1. An apparatus for centrifugally separating into its component parts through solvent extraction or other chemical means a liquid mixture having first and second immiscible liquids and contaminants dissolved or emulsified in the second liquid, comprising:

an elongate hollow inlet shaft including a first receiving end for receiving mixture, a second receiving end for receiving a solvent, a first discharge end through which the mixture is input into the apparatus, and a second discharge end through which the solvent is delivered into the apparatus;

a rotor rotatably disposed substantially coaxially to and surrounding the inlet shaft, said rotor including first reception means for receiving the mixture from the inlet shaft, first separation means for separating the mixture into its immiscible liquid parts, first discharge means for discharging the separated first liquid from the rotor, second reception means in the rotor for receiving the solvent from the input shaft, mixing means for mixing the solvent with the second liquid whereby the solvent at least partially absorbs the contaminants, second separation means for separating the solvent and absorbed contaminants from the second liquid, second discharge means in the rotor for discharging the separated second liquid from the rotor, and third discharge means in the rotor for discharging the separated solvent from the rotor;

rotation means for rotating the rotor around the inlet shaft;

a housing containing first, second, and third collection chambers for receiving and collecting the first liquid, second liquid, and solvent from their respective discharge means.

2. The apparatus of claim 1 wherein the first separation means comprises a first elongate annular separation chamber having an annular inlet end, a first inner wall sloped radially inward from the inlet end, a first outer wall sloped radially outward from the inlet end, a first weir disposed oppositely the inlet end, a lighter liquid annular passage formed between the first weir and the first inner wall, and a heavier liquid annular passage formed between the first weir and the first outer wall.

3. The apparatus of claim 2 wherein the first outer wall bends underneath the first weir radially inward and ends, lengthening the heavier liquid passage and forming a second weir, and wherein the solvent is injected from the second discharge end of the inlet port near the edge of the second weir.

4. The apparatus of claim 3 further comprising an air duct disposed between the first and second weirs to equalize pressure therein.

5. The apparatus of claim 1 wherein the second separation means comprises a second annular elongate separation chamber disposed radially outward from the first separation means.

6. A separator for separating into its component parts a mixture of a first fluid and a second fluid through rotation about a central axis of rotation, the first fluid having a density less than the density of the second fluid, comprising:

an inlet duct having a receiving end and a discharge end;

a separation chamber mounted for rotation about the axis of rotation, the separation chamber including
a first end,
a second end axially opposing the first end,
an outer wall,
an inlet passageway positioned at the first end of the separation chamber, the discharge end of the inlet duct being in fluid communication with the inlet passageway and positioned radially inwardly of the outer wall of the separation chamber,
a first fluid outlet passageway, and
a second fluid outlet passageway, the first and second fluid outlet passageways positioned at the second end of the separation chamber;

a first weir positioned in fluid communication with the first fluid outlet passageway of the separation chamber, the first weir having a front face, a back face and a substantially sharp crest, the sharp crest extending substantially annularly about the axis of rotation;

a second weir positioned in fluid communication with the second fluid outlet passageway of the separation chamber; and rotation means for rotating the separation chamber about the axis of rotation.

7. A separator as defined in claim 6, wherein the second weir has a front face, a back face and a substantially sharp crest, the sharp crest extending substantially annularly about the axis of rotation.

8. A separator as defined in claim 6, wherein the outer wall includes an edge which is rotatably connected to and sealed against the inlet duct.

9. A separator as defined in claim 6, further comprising a first and a second fluid collection chamber, the first fluid collection chamber positioned annularly about the axis of rotation and being in fluid communication with the first weir such that fluid passing over the first weir will enter the first fluid collection chamber, the second fluid collection chamber positioned annularly about the axis of rotation and being in fluid communication with the second weir such that fluid passing over the second weir will enter the second fluid collection chamber.

10. A separator as defined in claim 6, wherein the inlet duct is positioned coaxially with the axis of rotation.

11. A separator as defined in claim 6, further comprising an air duct connecting the first fluid passageway and the second fluid passageway.

12. A separator as defined in claim 6, further comprising a plurality of radially disposed plates positioned within the separation chamber.

13. A separator as defined in claim 12, wherein at least a portion of the radially disposed plates are made of a lipophilic material.

14. A separator as defined in claim 6, further comprising a mixing chamber positioned to receive fluid from the discharge end of the inlet duct and transmit the fluid to the separation chamber, the mixing chamber including an inner, stationary wall and an outer wall mounted for rotation about the axis of rotation.

15. A separator as defined in claim 6, wherein the separation chamber includes an annular inner wall with a radially inward slope extending from the fluid inlet passageway toward the first and second fluid outlet passageways, and wherein the outer wall has a radially outward slope extending from the inlet passageway toward the first and second fluid outlet passageways.

16. A separator as defined in claim 6, wherein the separator satisfies the following relationship:

$$r_w = .937 r_o + .05 r_p + .008 \frac{r_p^2}{r_o}$$

where $r_w$ is the radial distance from the axis of rotation to the surface of the second fluid as it passes over the second weir, $r_o$ is the radial distance from the axis of rotation to the surface of the first fluid as it passes over the first weir, and $r_p$ is the radial distance from the axis of rotation to the outermost portion of the interface between the first weir and the second fluid outlet passageway.

17. A separator for separating into its component parts a mixture of a first fluid and a second fluid through rotation about a central axis of rotation, the first fluid having a density less than the density of the second fluid, comprising:

an inlet duct positioned coaxially about the axis of rotation, the inlet duct having a receiving end and a discharge end;

a separation chamber mounted for rotation about the axis of rotation, the separation chamber including a first end, a second end axially opposing the first end, an outer wall, an inlet passageway positioned at the first end of the separation chamber, the discharge end of the inlet duct being in fluid communication with the inlet passageway and positioned radially inwardly of the outer wall of the separation chamber, a first fluid outlet passageway, a second fluid outlet passageway, the first and second fluid outlet passageways positioned at the second end of the separation chamber, and an annular inner wall with a radially inward slope extending from the fluid inlet passageway toward the first and second fluid exit passageways, and wherein the outer wall has a radially outward slope extending from the inlet passageway toward the first and second fluid outlet passageways;

a first weir positioned in fluid communication with the first fluid outlet passageway of the separation chamber;

a second weir positioned in fluid communication with the second fluid outlet passageway of the separation chamber, the first and second weirs each having a front face, a back face and a substantially sharp crest extending substantially annularly about the axis of rotation;

a first and a second fluid collection chamber, the first fluid collection chamber positioned annularly about the axis of rotation and being in fluid communication with the first weir such that fluid passing over the first weir will enter the first fluid collection chamber, the second fluid collection chamber positioned annularly about the axis of rotation and being in fluid communication with the second weir such that fluid passing over the second weir will enter the second fluid collection chamber; and rotation means for rotating the separation chamber about the axis of rotation.

18. A separator as defined in claim 17, wherein the outer wall includes an edge which is rotatably connected to and sealed against the inlet duct.

19. A separator as defined in claim 17, wherein the inlet duct is positioned coaxially with the axis of rotation.

20. A separator as defined in claim 17, further comprising an air duct connecting the first fluid passageway and the second fluid passageway.

21. A separator as defined in claim 17, further comprising a plurality of radially disposed plates positioned within the separation chamber.

22. A separator as defined in claim 21, wherein at least a portion of the radially disposed plates are made of a lipophilic material.

23. A separator as defined in claim 17, further comprising a mixing chamber positioned to receive fluid from the discharge end of the inlet duct and transmit the fluid to the separation chamber, the mixing chamber including an inner, stationary wall and an outer wall mounted for rotation about the axis of rotation.

24. A separator as defined in claim 17, wherein the separator satisfies the following relationship:

$$r_w = .937 r_o + .05 r_p + .008 \frac{r_p^2}{r_o}$$

where $r_w$ is the radial distance from the axis of rotation to the surface of the second fluid as it passes over the second weir, $r_o$ is the radial distance from the axis of rotation to the surface of the first fluid as it passes over the first weir, and $r_p$ is the radial distance from the axis of rotation to the outermost portion of the interface between the first weir and the second fluid outlet passageway.

25. An apparatus for centrifugally separating into its component parts, through rotation about an axis of rotation, a liquid mixture having first and second immiscible liquids and contaminants dissolved or emulsified in the second liquid, comprising:

an inlet duct having a first receiving end for receiving the liquid mixture, a second receiving end for receiving a solvent, a first discharge end through which the liquid mixture is discharged into the apparatus, and a second discharge end through which the solvent is discharged into the apparatus;

a first separation chamber mounted for rotation about the axis of rotation, the first separation chamber including an inlet passageway, a first fluid outlet passageway, and a second fluid outlet passageway, the first discharge end of the inlet duct being in fluid communication with the inlet passageway of the first separation chamber;

a first weir positioned in fluid communication with the first fluid outlet passageway of the first separation chamber;

a second weir positioned in fluid communication with the second fluid outlet passageway of the first separation chamber;

a second separation chamber mounted for rotation about the axis of rotation, the second separation chamber including an inlet passageway, a first fluid outlet passageway, and a second fluid outlet passageway, the second weir and the second discharge end of the inlet duct being in fluid communication with the inlet passageway of the second separation chamber;

a third weir positioned in fluid communication with the first fluid outlet passageway of the second separation chamber;

a fourth weir positioned in fluid communication with the second fluid outlet passageway of the second separation chamber; and rotation means for rotating the first and second separation chambers about the axis of rotation.

26. An apparatus as defined in claim 25, further comprising a first, a second, and a third fluid collection chamber, the first fluid collection chamber positioned annularly about the axis of rotation and being in fluid communication with the first weir such that fluid passing over the first weir will enter the first fluid collection chamber, the second fluid collection chamber positioned annularly about the axis of rotation and being in fluid communication with the fourth weir such that fluid passing over the fourth weir will enter the second fluid collection chamber, the third fluid collection chamber positioned annularly about the axis of rotation and being in fluid communication with the third weir such that fluid passing over the third weir will enter the third fluid collection chamber.

27. An apparatus as defined in claim 25, wherein the first, second, third, and fourth weirs each have a front face, a back face and a substantially sharp crest extending substantially annularly about the axis of rotation.

* * * * *